UNITED STATES PATENT OFFICE.

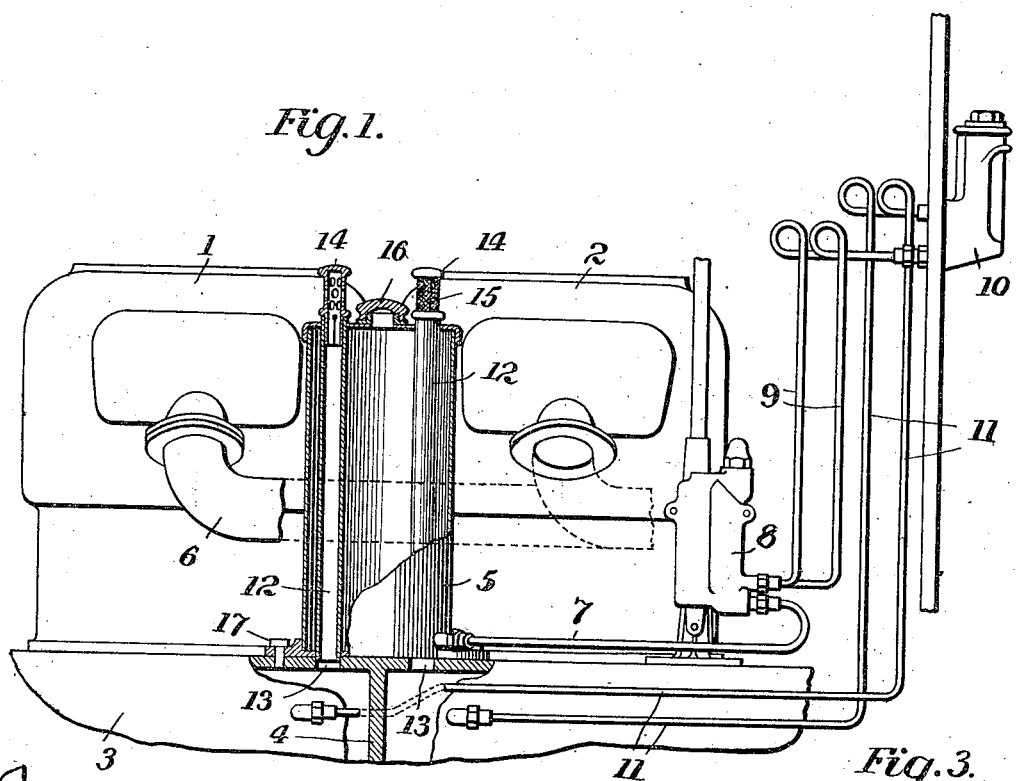

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE-LUBRICATING MEANS.

962,509. Specification of Letters Patent. Patented June 28, 1910.

Application filed June 4, 1906. Serial No. 320,189.

*To all whom it may concern:*

Be it known that I, RUSSELL HUFF, a citizen of the United States, and resident of Detroit, Wayne county, State of Michigan, have invented certain new and useful Improvements in Motor-Vehicle-Lubricating Means, of which the following is a specification.

This invention relates to improvements in means for lubricating hydrocarbon motors for motor vehicles.

The object of the invention is to provide means for keeping the lubricating oil in a uniformly fluid condition so that it may be readily and uniformly circulated through the oil feeding devices and to the various points at which it is required to be delivered.

The invention further relates to the various details which will be hereinafter pointed out.

In the accompanying drawing, Figure 1 illustrates a side elevation of a hydrocarbon engine for a motor vehicle, a portion of the crank case partly broken away and the oil tank partly in section; Fig. 2 is a plan view of the parts illustrated in Fig. 1; and Fig. 3 is a detail of the cap for one of the vent tubes.

The accompanying drawing illustrates a four-cylinder hydrocarbon motor there being two cylinders in the casing 1 and two additional cylinders in the casing 2. These casings rest upon a base 3 which supports the engine and also comprises a hollow crank case in which the crank shaft runs. The crank case is divided into two compartments by a central partition 4 between the cylinder casings 1, 2. The lubricating apparatus illustrated is of the "splash type" in which a quantity of oil is contained in the crank case, the cranks dipping into it and splashing oil up into the cylinders, thus lubricating the pistons and connecting rods. To maintain the oil at proper elevation in the crank case and to replace oil which may leak out or evaporate or be otherwise consumed by the engine, a substantially constant discharge of oil into the crank case is maintained.

A substantially cylindrical vertically arranged oil tank 5 is located between and close to the cylinder casings 1, 2, and preferably between the exhaust pipe 6 and the said cylinder casings, the heat from the cylinder casings and the exhaust pipe being thus utilized to keep the oil warm and fluid and at a substantially constant temperature when the engine is running. From the tank the oil passes through a pipe 7 to a pump 8. From the pump the oil is discharged through pipes 9, sight feed devices 10, and pipes 11 to the two compartments of the crank case 3, one of the pipes 11 discharging on each side of the partition 4.

The oil tank is located over the partition 4 and two vertical vent pipes 12 extend up through the tank, forming conduits between the compartments of the crank case and the atmosphere above the tank. These vent pipes are permanently connected with the oil tank and when the oil tank is secured in proper position upon the engine base the vent pipes register with openings 13 in the top of the crank case. These vent pipes provide for the escape of the hot gases which may leak past the pistons during the explosion and compression strokes and also the gases which may be generated by the action of the heat upon the lubricating oil and these hot gases assist in maintaining the oil in the tank at a sufficiently high temperature. The upper ends of the vent pipes are closed by caps 14, the openings in which are preferably covered with gauze 15, as shown in detail in Fig. 3. The tank is also provided with a filling opening normally closed by a cap 16. The oil tank is provided with a base which is preferably secured to the engine base by suitable bolts or screws 17.

It will be understood that the oil tank 5 is located close to and preferably in contact with the cylinder casings 1, 2, so that the heat from the cylinders will readily be communicated to the oil in the tanks. The exhaust pipes are also very hot when the engine is running and it is preferred to have the oil tank close to or in contact with one of the exhaust pipes.

Having described my invention what I claim and desire to secure by Letters Patent is, 1. In a motor vehicle, the combination with an engine base constituting a crank case, of cylinder casings supported on said base, an oil tank supported on said base and contiguous to said casings, and a vent tube passing through and connected with the oil tank, said vent tube communicating with the crank case below the oil tank and with the atmosphere above the oil tank.

2. In a motor vehicle, the combination with the base, crank case, and cylinder casing of a hydrocarbon engine, and with the exhaust pipe thereof, of an oil tank seated on said base and located between said exhaust pipe and said cylinder casing whereby the oil tank is kept warm by the heat of the cylinder and the exhaust pipe, and means for delivering oil from said tank to said crank case.

3. In a motor vehicle, the combination with an engine base having two compartments and a cylinder casing arranged above each compartment, an oil tank supported on said base contiguous to said cylinder casing and two vent tubes extending through and connected with said oil tank, the said vent tubes communicating with the atmosphere at their upper ends and with the respective crank case compartments at their lower ends, for the purposes set forth.

4. In a motor vehicle, the combination with a hydrocarbon engine having a plurality of cylinders located side by side, of an oil tank located between two of said cylinders, whereby the oil will be heated by the heat from said cylinders.

5. In a motor vehicle, the combination with a hydrocarbon engine having a plurality of cylinders located side by side and an exhaust pipe for said one of said cylinders, of an oil tank located between two of said cylinders and said exhaust pipe, whereby the oil will be heated by the heat from said cylinders and exhaust pipe.

6. In a motor vehicle, the combination with a hydrocarbon engine having a crank case and a cylinder mounted thereon, of an oil tank mounted on said crank case, a heating tube passing through said tank, and means for supplying a heating medium from said crank case to said tube.

In testimony whereof I affix my signature in presence of two witnesses.

RUSSELL HUFF.

Witnesses:
  MARK C. TAYLOR,
  F. E. PAINE, Jr.